Dec. 7, 1926.

W. E. GIESECKE ET AL 1,609,352

KNIFE FOR CUTTING NUTS

Filed Nov. 21, 1925

INVENTOR.
WILLIAM E. GIESECKE
OTTO L. KIESELBACH
BY
ATTORNEYS.

Patented Dec. 7, 1926.

1,609,352

UNITED STATES PATENT OFFICE.

WILLIAM E. GIESECKE AND OTTO LEON KIESELBACH, OF NEW YORK, N. Y., ASSIGNORS TO CHARLES T. WILSON COMPANY, INC., OF NEW YORK, N. Y., A CORPORATION OF NEW YORK.

KNIFE FOR CUTTING NUTS.

Application filed November 21, 1925. Serial No. 70,523.

This invention is an improvement in nut cracking machines, and more particularly in cutter heads for machines of this character.

In the usual construction, designed for cracking the Babassu palm nut, heads are provided movable toward and from each other, and adapted to engage the nut between them, one or both of the heads being provided with a set of radially arranged blades or knives to simultaneously cut and crack the nut, when the heads are forced together on the nut.

The blades of the character shown in Patent No. 1,492,131, April 29, 1924 are wedge shape and fixed with respect to the head, and they exert a combined cutting and splitting action on the nut, so that all of the seed containing chambers or cells are broken open.

The shells of the Babassu palm nuts are composed of pericarp, mesocarp, and endocarp, the latter being a homogeneous hard dense substance interspersed with fibers running longitudinally of the nut. The pericarp is of a tough and resistant fibrous nature, while the mesocarp is amorphous and relatively soft.

The coarse fibers of the pericarp together with the fibers traversing the endocarp, form on the butt end of the nut a vaulted covering protecting the nut eyes. The wings which separate the kernel cells of the nut spring from a central column or mast of a very fine grained hard character, and this mast or column is the most resistant part of the nut, so far as regards compression stresses.

As heretofore constructed the cutting blades or knives have been arranged to cut longitudinally of the nut, with a combined cutting and splitting action along definite lines parallel with the direction of movement of the nut, and regardless of the direction of the split made by the blade.

One of the primary objects of the present invention is the provision of a construction of cutter head wherein the blades are so constructed and arranged that they will operate not only longitudinally of the nut, but radially as well, thus to thoroughly open all of the kernel cells.

Another object is the provision of a blade so mounted, that it may within limits conform itself to the direction of the split.

Another object is the provision of a blade constructed in the manner of the ax and designed to operate in a similar manner, that is by a combined chopping and splitting action.

With these and other objects in view, the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings—

Figure 1:
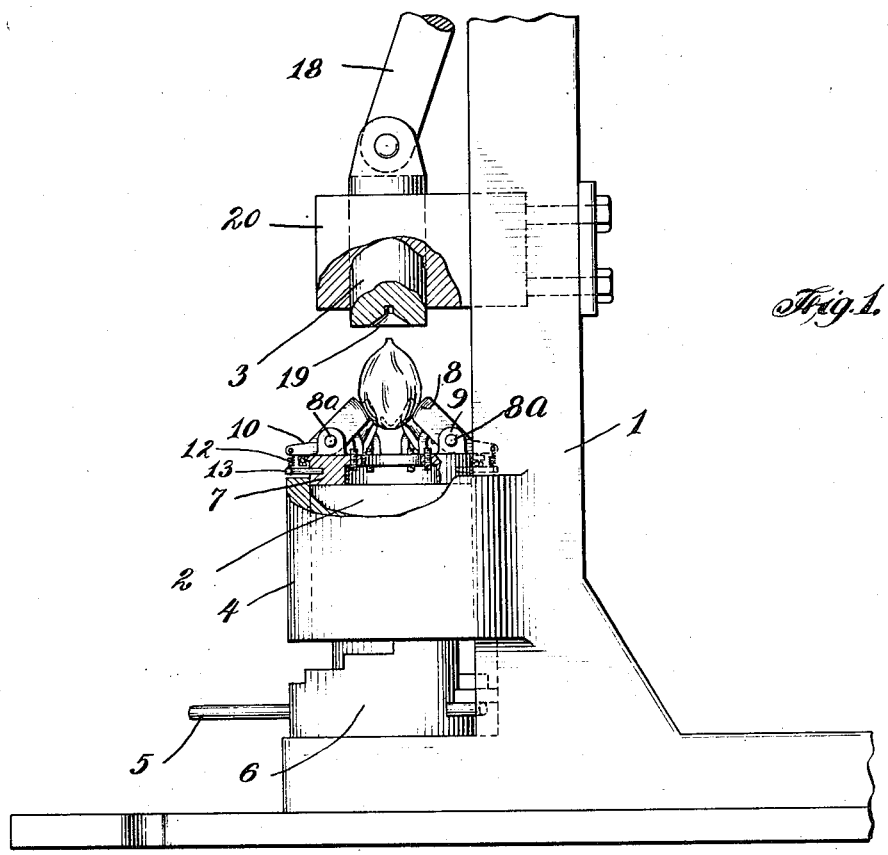
Fig. 1 is a side view of a part of the machine provided with one of the improved heads.
Figure 2:
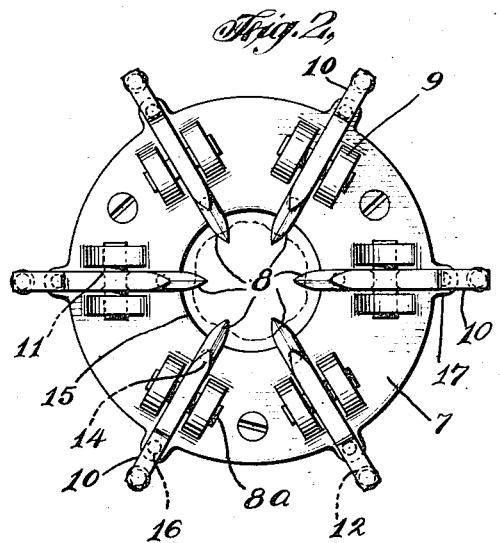
Fig. 2 is a plan view of the head.

In the present embodiment of the invention, the cracking machine, which may be of the same character as that forming the subject matter of the above mentioned patent, includes a suitable frame 1, carrying relatively fixed and movable heads 2 and 3, the latter being slidably connected with the frame for movement toward and from the head 2.

The head 2 is mounted in a bearing ring or housing 4 on the frame, and is vertically adjustable by means of a cross pin 5 extending transversely of the head near its bottom and adapted to engage one of the steps of a stepped cam 6 supported by the frame. A ring 7 is carried by the upper end of the head, the ring being secured to the head in any suitable or desired manner, and the ring carries a set of blades 8.

Figure 3:
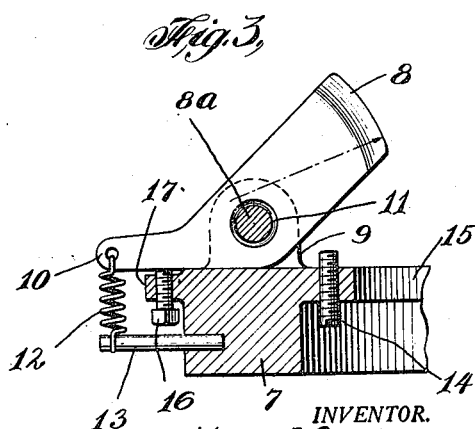
Fig. 3 is an enlarged detail of one of the blades with a part of the head in section.

Each of these blades as shown more particularly in Fig. 3 is modeled after the blade of an ax, that is, it is substantially rectangular in outline, having the cutting edge at one end of the long axis and each blade is pivoted at 8ª to the ring, the pivot being at a point which would correspond to the head of the ax that is at the opposite end of the long axis from the cutting edge. Each of the pivots 8ª, it being understood that one is provided for each blade, is supported by a pair of lugs 9 on the ring, and each blade has a tail 10 on the opposite side of the pivot from the cutting edge for a purpose to be presently described.

Any desired or convenient number of blades may be provided, the said blades being arranged in a circle, and in pairs, preferably the members of each pair occupying a diameter of the ring. In order to permit the blade to follow the line of the split of the nut within limits, the blades have a limited lateral movement on the pivot.

Referring to Fig. 3, it will be seen that the ends of the opening 11 which receives the pivot are slightly flaring, and each pair of lugs 9 is spaced apart a distance appreciably greater than the thickness of the blade. This arrangement permits some lateral movement of each blade, and also permits a rocking movement of the blades with respect to the pivot, so that, within limits prescribed by the spacing of the lugs 9, and the flaring of the bore 11, the blade may swing laterally to follow the line of split in the shell of the nut.

It will be noticed referring to Figure 3 that the tail 10 extends at an obtuse angle from the direction of length of the blade, and the arrangement is such that when the lower edge of the tail engages the face of the ring the blade is held at an angle of about 45° to the plane of the ring, and the blades are normally held in this position by means of a spring 12 arranged between the tail and a pin 13 extending radially from the ring.

The blades are limited in the movement of the cutting edges toward the ring by set screws 14, which are threaded through an inwardly extending flange 15 at the top of the ring. The set screws are adjustable, so that the extent of movement of each blade may be regulated. Means are also provided to vary the angle at which the blade normally stands with respect to the ring. This means is a set screw 16 threaded through an outwardly extending bracket lug 17 on the ring. Each set screw engages the under edge of the tail of the adjacent blade on the opposite side of the pivot pin from the set screw 14.

In the present instance the head provided with the cutting blades is relatively fixed, and a movable counter-pressure head cooperates therewith. This head 3 is movable through a bearing block 20, supported by the frame, and is operated by any suitable mechanism indicated generally at 18, to move the head toward and from the lower head. The head 3 is recessed in the end adjacent to the lower head as indicated at 19, to receive the pointed end of the nut.

In operation, the nuts to be cracked are laid in succession in the seat formed by the blades between said blades, as clearly shown in Fig. 1. It will be noticed referring to this figure and Fig. 3, that the cutting edges of the blades are arc-shaped, but the arc does not have the pivot pin for its center. The center of the arc is above the pivot pin, as indicated by the dotted line. This causes the cutting edges of the blades to face inwardly to a greater extent than were they formed on the pivot pin as a center.

When the nut is placed, the head 3 is moved downward engaging the pointed end thereof, and forcing the nut onto the blades. Each blade may swing laterally within limits, and as the nut is forced downward, the blades travel upwardly with respect to the nut, and also inwardly, insuring the thorough breaking up of the hard shells of the nut, whereby to release all of the kernels.

While the cutting blades in the present instance are shown as arc shaped and eccentric to the pivots with the center above the pivot it is obvious that the center upon which the cutting edge is formed might be below the pivot or concentric therewith. The cutting edges of the blade might also be straight, or sinuous, or in any other shape it might be found advisable or useful in practice.

We claim:

1. In a nut cracking machine a cutter head including a set of substantially ax shaped blades oppositely mounted, each blade a substantially rectangular plate having a cutting edge at one end, the blades arranged with their cutting edges adjacent, and means for supporting the blades in converging relation at substantially a right angle with respect to each other.

2. In a nut cracking machine a cutter head including a set of substantially ax shaped blades oppositely mounted, each blade a substantially rectangular plate having a cutting edge at one end, the blades arranged with their cutting edges adjacent, and means for supporting the blades in converging relation at substantially a right angle with respect to each other, the support including a ring to which the blades are connected at opposite sides thereof.

3. In a nut cracking machine a cutter head including a set of substantially ax shaped blades oppositely mounted, each blade a substantially rectangular plate having a cutting edge at one end, the blades arranged with their cutting edges adjacent, and means for supporting the blades in converging relation at substantially a right angle with respect to each other, the supporting means for the blades including a ring to which the blades are pivoted to swing axially of the ring.

4. In a nut cracking machine a cutter head including a set of substantially ax shaped blades oppositely mounted, each blade a substantially rectangular plate having a cutting edge at one end and the blades arranged with their cutting edges adjacent, and means for supporting the blades in converging relation at substantially a right angle with respect to each other, the supporting means for the blades including a ring to which the blades are pivoted to swing axially of the ring, and yielding means to normally hold the blades in the converging substantially right angle relation.

5. In a nut cracking machine a cutter head including a set of substantially ax shaped blades oppositely mounted, and with their cutting edges adjacent, and means for supporting the blades in converging relation at substantially a right angle with respect to each other, the supporting means for the blades including a ring to which the blades are pivoted to swing axially of the ring, yielding means to normally hold the blades in the converging substantially right angle relation, and adjustable means to limit the swinging of the blades in each direction.

6. In a nut cracking machine a cutter head including a set of substantially ax shaped blades oppositely mounted, and with their cutting edges adjacent, and means for supporting the blades in converging relation at substantially a right angle with respect to each other, the blades pivoted to the supporting means to swing toward and from each other, said blades having arc shaped cutting edges eccentric to the pivotal connection.

7. In a nut cracking machine a cutter head including a set of substantially ax shaped blades oppositely mounted, and with their cutting edges adjacent, and means for supporting the blades in converging relation at substantially a right angle with respect to each other, the blades pivoted to the supporting means to swing toward and from each other, and mounted to rock laterally.

8. In a nut cracking machine a cutter head including a set of substantially ax shaped blades oppositely mounted, and with their cutting edges adjacent, and means for supporting the blades in converging relation at substantially a right angle with respect to each other, pivot pins for the blades carried by the supporting means on which the blades may swing toward and from each other, the blades mounted to rock laterally on the pivot pins.

9. In a nut cracking machine a cutter head including a set of substantially ax shaped blades oppositely mounted, and with their cutting edges adjacent, and means for supporting the blades in converging relation at substantially a right angle with respect to each other, pivot pins for the blades carried by the supporting means on which the blades may swing toward and from each other, the blades mounted to rock laterally on the pivot pins, and yeilding means to normally hold the blades in the converging substantially right angular relation.

10. In a nut cracking machine a cutter head including a set of substantially ax shaped blades oppositely mounted, and with their cutting edges adjacent, and means for supporting the blades in converging relation at substantially a right angle with respect to each other, pivot pins for the blades carried by the supporting means on which the blades may swing toward and from each other, the blades mounted to rock laterally on the pivot pins, yielding means to normally hold the blades in the converging substantially right angular relation, and means to limit the swinging movement of the blades in each direction.

11. In a nut cracking machine, a cutter head including a pair of oppositely arranged blades pivoted at their remote ends in substantially the same plane and having their adjacent ends provided with cutting edges, and means acting normally to hold the blades in converging relation inclining in the same direction from the plane.

12. In a nut cracking machine, a cutter head including a pair of oppositely arranged blades pivoted at their remote ends in substantially the same plane and having their adjacent ends provided with cutting edges, and means acting normally to hold the blades in converging relation inclining in the same direction from the plane, said means yielding.

13. In a nut cracking machine, a cutter head including a pair of oppositely arranged blades pivoted at their remote ends and having their adjacent ends provided with cutting edges, means acting normally to hold the blades in inclined converging relation, said means yielding, and means to regulate the pivotal movement of the blades in each direction.

14. In a nut cracking machine, a cutter head including a pair of oppositely arranged blades pivoted at their remote ends in substantially the same plane and having their adjacent ends provided with cutting edges, and means acting normally to hold the blades in converging relation inclining in the same direction from the plane, the cutting edges arc-shaped and eccentric to the pivot.

15. In a nut cracking machine means to move a nut axially in one direction, blades in the path of movement of the nut, said blades having arc-shaped cutting edges, means to mount the blades to swing with the nut and toward each other under the pressure of the nut, and means to limit the swinging movement of the blades, the cutting edges of the blades arc-shaped and eccentric to the axis on which the blades swing.

Signed at New York city in the county of New York and State of New York this 20th day of November A. D. 1925.

WILLIAM E. GIESECKE.
OTTO LEON KIESELBACH.